United States Patent
Akiyama et al.

(10) Patent No.: US 7,115,309 B2
(45) Date of Patent: Oct. 3, 2006

(54) SYNTHETIC RESIN PREFORM TO BE BIAXIALLY STRETCHED AND BLOW MOLDED INTO A BOTTLE

(75) Inventors: Yoshio Akiyama, Tochigi (JP); Hiroaki Tokuda, Tokyo (JP); Makoto Busujima, Tokyo (JP); Shuichi Koshio, Matsudo (JP); Masaaki Sasaki, Matsudo (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 0 days.

(21) Appl. No.: 10/129,081

(22) PCT Filed: Dec. 20, 2001

(86) PCT No.: PCT/JP01/11159

§ 371 (c)(1),
(2), (4) Date: Jun. 12, 2002

(87) PCT Pub. No.: WO02/053341

PCT Pub. Date: Jul. 11, 2002

(65) Prior Publication Data

US 2002/0182351 A1   Dec. 5, 2002

(30) Foreign Application Priority Data

| Dec. 20, 2000 | (JP) | ............................. 2000-387796 |
| Jun. 19, 2001 | (JP) | ............................. 2001-185473 |
| Dec. 18, 2001 | (JP) | ............................. 2001-384130 |

(51) Int. Cl.
   *B32B 1/02* (2006.01)

(52) U.S. Cl. ................... 428/35.7; 428/34.1; 428/34.3; 428/35.9; 428/36.6; 428/36.7; 220/62.2; 220/62.22

(58) Field of Classification Search ............... 428/35.7, 428/35.9, 36.6, 36.7, 34.1, 34.3; 220/62.2, 220/62.22
See application file for complete search history.

(56) References Cited

U.S. PATENT DOCUMENTS

| 4,007,243 A |   | 2/1977  | Rupert ......................... 264/89 |
| 4,108,937 A | * | 8/1978  | Martineu et al. ........... 264/529 |
| 4,806,091 A |   | 2/1989  | Linss et al. .................. 425/529 |
| 4,808,105 A |   | 2/1989  | Linss et al. .................. 425/529 |
| 4,849,154 A |   | 7/1989  | Masumoto ................... 264/539 |
| 4,903,852 A |   | 2/1990  | Masumoto ................... 220/675 |
| 4,946,368 A |   | 8/1990  | Masumoto ................... 425/525 |
| 4,980,211 A |   | 12/1990 | Kushida et al. ............ 428/36.7 |

(Continued)

FOREIGN PATENT DOCUMENTS

EP          0664193          7/1995

(Continued)

*Primary Examiner*—Marc A. Patterson
(74) *Attorney, Agent, or Firm*—Oliff & Berridge, PLC

(57) ABSTRACT

The blow molded preform of a laminated wall structure comprises a bulging shoulder portion which has a diameter that widens slightly in the downward direction; a bottom shell portion for molding a bottom, which has been blow molded from a corresponding portion of a parison so as to have a widened and deformed shape; an inner overhang wall portion in any position starting from the opposite side of a neck ring and ending at the upper portion of a bulging shoulder portion, with an inner wall portion having a diameter that widens in the downward direction; and/or a radially widened connecting portion of an arced shape, which has a larger diameter than a barrel portion so that the entire bottom including a bottom shell portion takes a bulging spherical shape.

19 Claims, 11 Drawing Sheets

U.S. PATENT DOCUMENTS

| | | | |
|---|---|---|---|
| 5,051,085 A | 9/1991 | Masumoto | 425/526 |
| 5,520,877 A | 5/1996 | Collette et al. | 264/521 |
| 5,531,060 A * | 7/1996 | Fayet et al. | 53/426 |
| 5,571,871 A * | 11/1996 | Ikeda et al. | 525/537 |
| 5,676,267 A | 10/1997 | Slat et al. | 215/12.1 |
| 5,906,286 A | 5/1999 | Matsuno et al. | 215/375 |
| 6,063,325 A | 5/2000 | Nahill et al. | 264/513 |
| 6,090,334 A | 7/2000 | Matsuno et al. | 264/458 |
| 2001/0012550 A1 | 8/2001 | Tokuda et al. | |

FOREIGN PATENT DOCUMENTS

| | | | |
|---|---|---|---|
| EP | 0739823 | | 10/1996 |
| FR | 1 262 748 | | 6/1961 |
| GB | 2141970 | * | 1/1985 |
| JP | A 55-132223 | | 10/1980 |
| JP | A 57-12619 | | 1/1982 |
| JP | A 58-119830 | | 7/1983 |
| JP | 59 115816 | | 7/1984 |
| JP | 61053021 | * | 3/1986 |
| JP | A 61-123513 | | 6/1986 |
| JP | 61 266223 | | 11/1986 |
| JP | 10 329203 | | 12/1998 |
| JP | A 2001-170994 | | 6/2001 |

* cited by examiner

SYNTHETIC RESIN PREFORM TO BE BIAXIALLY STRETCHED AND BLOW MOLDED INTO A BOTTLE

TECHNICAL FIELD

This invention relates to the structure of a preform that is biaxially stretched and blow molded into a synthetic resin bottle, and particularly to the type of preform that has been molded by a blow molding means, among other types of preforms that have been molded into the primary molded intermediates of a cylindrical shape having a closed end.

BACKGROUND ART

As the synthetic resin preforms that have been molded into the primary molded intermediates and are to be biaxially stretched and blow molded into bottles, there are known those preforms of a cylindrical shape having a closed end, which have been molded by an injection molding means or a blow molding means. As compared to the injection molded preforms, the blow molded preforms can be obtained at less expensive costs, more freely molded into various shapes, and are easy to adopt the laminated wall structures.

Thus, the blow molded preforms have the following advantages. Firstly, their cost of equipment is lower than the corresponding cost for injection-molded preforms, and the blow-molded products can be sold at a lower price than the injection molded ones. Secondly, because they are highly versatile in selecting shapes, the preforms can be molded into a shape that fits in with the appearance of a bottle to be molded. Thirdly, because they are easy to adopt the laminated wall structures, the thin-wall bottles can be obtained while desired physical properties can be effectively maintained.

However, the above prior art has a problem in that local thick areas tend to occur in the shoulder portion and on the underside of the bottom of the molded bottle. Because of these thick areas, the molded bottles have a bias of thickness in the walls, thus resulting in decreased precision in the overall wall thickness.

SUMMARY OF THE INVENTION

This invention has been made to solve such a problem observed in prior art. The technical problem of this invention is thus to prevent local thick areas from occurring in the preform. The object of this invention is to obtain those bottles having high precision in the overall wall thickness and thus having no distortion in their appearance.

In this invention made to solve the above-described technical problem, the means of carrying out the invention may comprise:
employing a blow-molded preform so that the preform is molded into a bottle by a
biaxially stretching and blow molding means;
providing the preform with a mouth portion;
providing the preform with a cylindrical barrel portion from which the barrel is molded;
providing the preform with a bulging shoulder portion from which the shoulder is molded, disposing this portion between the mouth portion and the barrel portion, and allowing the bulging shoulder portion to have the diameter that widens slightly in the downward direction;
providing the preform with a bottom shell portion for molding the bottom, which portion has been blow molded from the corresponding portion of parison P so as to have a widened and deformed shape;
providing the preform with an inner overhang wall portion an inner overhang wall portion (3') in any position starting from the opposite side of the neck ring (3), which is disposed circumferentially around the lower part of the mouth portion (2), and ending at the upper portion of the bulging shoulder portion (4'), with the inner wall portion (3') having a diameter that widens in the downward direction; and
providing the preform with certain laminated wall structures.

The means of carrying out the invention may also comprise:
employing a blow-molded preform so that the preform is molded into a bottle by a biaxially stretching and blow molding means;
providing the preform with a mouth portion;
providing the preform with a cylindrical barrel portion from which the barrel is molded;
providing the preform with a bulging shoulder portion from which the shoulder is molded, disposing this portion between the mouth portion and the barrel portion, and allowing the bulging shoulder portion to have the diameter that widens slightly in the downward direction;
providing the preform with a bottom shell portion for molding the bottom, which portion has been blow molded from the corresponding portion of parison P so as to have a widened and deformed shape;
providing the preform with a radially widened connecting portion (6') connecting the lower part of the cylindrical barrel portion (5') with the bottom shell portion (7'), with the connecting portion (6') having a larger diameter than the barrel portion (5'); and providing the preform with certain laminated wall structures.

DISCLOSURE OF THE INVENTION

In certain exemplary embodiments of the invention, for example, the bulging shoulder portion may have a diameter that widens slightly in the downward direction. As a result, the barrel portion has a larger diameter than the mouth portion. This makes it possible to lower the percent of stretch in the circumferential direction when the preform is biaxially stretched and blow molded into a bottle. According to this invention, even those bottles having a high blow ratio can be molded with high stability and good moldability. The shape of the bulging shoulder portion can be selected from among those suitable for the purpose. For example, a linear or curved slope can be used.

The bottom shell portion for molding the bottom has been blow molded from the corresponding portion of parison P in the widened and deformed shape. With the preform of such a shape, the bottom of the bottle is stretched and blow molded in the circumferential direction. The pinch-off portion of the bottom shell portion is also stretched, even if the pinch-off portion is generally thick because this portion of the preform is derived from the pinch-off scar in the parison P. Thus, the thick area is prevented from occurring in the bottom.

Any widened and deformed shape of the bottom shell portion can be selected depending on purpose and necessity and in response to the shape intended for the bottom of a bottle. For example, the preform can be in an isotropic shape. The preform bottom may have a shape similar to the bottom of the bottle but in a reduced proportion. In that case, the bottom of the bottle is stretched almost uniformly in the circumferential direction. Even if any distorted deformation takes place at the bottom, this deformation is circumferentially uniform. Therefore, there is no case where this deformation caused by distortion may deteriorate the appearance and shape of the bottle or where the deformed bottom makes the bottle unstable.

In other exemplary embodiments of the invention, the neck ring is disposed circumferentially around the mouth portion at its lower part where no stretching occurs. The inner overhang wall portion is disposed in any position starting from nearby the opposite side of the neck ring, which is disposed circumferentially around the lower part of the mouth portion, and ending at the upper portion of the bulging shoulder portion, with the inner wall portion having a diameter that widens in the downward direction. Even if a local thick area is formed by pushing the core guide into the parison mouth when the parison is blow molded, this thick area in the inner overhang wall portion does not remain thick because blow molding operation forces this area to be stretched and deformed.

In certain exemplary embodiments of the invention the means of carrying out the invention comprises that the bottom shell portion to be molded into the bottom of the bottle has a roughly spherical shape.

Because the bottom shell portion to be molded into the bottom of the bottle has a roughly spherical shape, the preform can be blow molded in a mold of a simple shape to achieve isotropically widened deformation and expanded deformation. Especially in the bottle having a bottom of a roughly isotropic cross section, the bottom of the preform is stretched almost uniformly in the circumferential direction. Even if any distorted deformation takes place at the bottom, this deformation is circumferentially uniform. Therefore, there is no case where this deformation caused by distortion may deteriorate the appearance and shape of the bottle or where the deformed bottom loses its stable sitting function.

In other exemplary embodiments of the invention, the preform comprises a radially widened connecting portion connecting the lower part of the cylindrical barrel portion with the bottom shell portion, and this connecting portion has a larger diameter than the barrel portion. When the parison is blow molded into a preform, the bottom shell portion, along with this radially widened connecting portion, is stretched and deformed up to the last moment of blow molding and in a locally concentrated manner.

Because of a pinch-off scar in the parison, the pinch-off portion of the bottom shell is generally thick, but it is largely stretched up to the last moment of the blow molding and in a locally concentrated manner. So the pinch-off portion has a decreased wall thickness and does not remain thick.

In other exemplary embodiments of the invention, the means of carrying out the invention comprises that the bottom shell portion to be molded into the bottom of a bottle has a roughly spherical shape and that the radially widened connecting portion connects the lower part of the cylindrical barrel portion with the bottom shell portion, and has a larger diameter than the barrel portion so that this portion has a bulging shape.

In the above-described configuration, the preform comprises the bottom shell portion of a roughly spherical shape and a radially widened connecting portion of an arced shape that connects the lower part of the cylindrical barrel portion with the bottom shell portion, and this connecting portion has a larger diameter than the barrel portion so that this portion makes an arc. With this configuration, the parison can be blow molded in a mold of a simple shape to achieve isotropically widened deformation and expanded deformation and thereby to form the bottom shell portion and the radially widened connecting portion. Especially in the bottle having the bottom and the radially widened connecting portion of a roughly isotropic cross section, the bottom and the connecting portion of the preform are stretched almost uniformly in the circumferential direction. Even if any distorted deformation takes place at the bottom, this distorted deformation is circumferentially uniform. Therefore, there is no case where this distorted deformation may deteriorate the bottle appearance and shape or where the deformed bottom loses its stable sitting function.

In still other exemplary embodiments of the invention, the invention also comprises an inner overhang wall portion in any position starting from the opposite side of the neck ring, which is disposed circumferentially around the lower part of the mouth portion, and ending at the upper portion of the bulging shoulder portion, with the inner wall portion having a diameter that widens in the downward direction.

In this exemplary embodiment, thick areas are prevented from occurring in both of the pinch-off portion and the inner overhang portion in any position starting from the opposite side of the neck ring and ending at the upper portion of the bulging shoulder portion.

In other exemplary embodiments of the invention, the means of carrying out the invention comprises at least one of the bulging shoulder portion, the cylindrical barrel portion, and the bottom shell portion having a shape similar to the shoulder, the barrel, or the bottom, respectively, of the bottle, but on a reduced scale.

For example, the preform is given partly or entirely a bottle-like shape on a reduced scale. Such a shape gives the preform more uniform percent of stretch than usual, when the preform is biaxially stretched and blow molded into a bottle. Even if the bottle has a complicated shape, such as being largely non-isotropic, or having a shape with various ups and downs, there can be obtained a less deformed bottle of uniform thickness with high stability and good moldability.

In certain other exemplary embodiments of the invention, the means of carrying out the invention comprises a reinforcing rib disposed on the downside of the pinch-off portion in the bottom shell portion.

The pinch-off portion is welded by the crushing power of the blow mold when the parison is pinched off. Even if a groove-like sink mark is formed due to the welding failure in the surface of the pinch-off portion (the inner surface of the bottom shell portion), the reinforcing rib can make up for the decrease in the weld area caused by this sink mark. When the preform is biaxially stretched and blow molded into a bottle, the reinforced pinch-off portion can be blow molded without rupture, thus giving assurance for the stable biaxial-stretching and blow-molding operation.

In the perform of various exemplary embodiments of the invention, it has become possible to combine laminates of synthetic resin materials having different physical properties and thereby to mold those bottles in which desired physical properties or functions are effectively utilized. The resin combinations also make it possible to utilize safely even those molding materials, such as the regenerated resin materials, which may arouse concern for their use unless they are subjected to further treatment.

In another exemplary embodiment of the invention, the means of carrying out the invention comprises the laminated wall structure consisting of at least a layer of polyethylene terephtalate resin (hereinafter referred to as PET) and a layer of polyethylene naphthalate resin (hereinafter referred to as PEN).

PET is mainly used as the PET resins in this invention. However, polyester copolymers containing ethylene terephthalate units as the major component and other polyester units can also be used, unless the substance of PET is lost. Other components for obtaining polyester copolymers include the dicarboxylic acid components, such as isophthalic acid, naphthalene-2,6-dicarboxylic acid, and adipic acid; and the glycol components, such as propylene glycol, 1,4-butanediol, tetramethylene glycol, neopentyl glycol, cyclohexane dimethanol, and diethylene glycol.

Amorphous PET resins can also be used as PET. These amorphous PET resins show no melting peak when they are measured for the melting temperature, Tm, on the differential scanning calorimeter (DSC). As an example, PETG (Eastman Chemical) is available, which is obtained by copolymerizing PET with such a glycol component as cyclohexane dimethanol.

The PEN resins used in this invention are the polyester copolymers containing PEN comprising ethylene-2,6-naphthalate units and other ethylene-2,6-naphthalate units at a concentration of 50 mol % or more. As the examples of acid components of the copolymer, there may be mentioned terephthalic acid, isophthalic acid, and hexahydro-terephthalic acid. The glycol components of the copolymer include, for example, 1,3-propanediol, tetramethylene glycol, 1,4-cyclohexane dimethanol, and neopentyl glycol.

The PET resin layer is combined with the PEN resin layer. This combination serves to enhance effectively the properties that seem to be deficient in the PET resin, such as thermal resistance, resistance to chemicals, and UV-cutting property.

In yet other exemplary embodiments of the invention, the means of carrying out the invention comprises the laminated wall structure consisting of at least the outer and inner layers of a PET resin and the middle layer of a gas barrier resin. The gas barrier resins, which are well known in the art and can be used in this invention, include nylon resins, such as nylon-6, nylon-66, and polyamide containing xylylene radicals; the ethylene vinyl alcohol polymer; and the polyacrylonitrile resin.

In this exemplary embodiment of the invention, there is obtained a bottle having enhanced barrier properties against oxygen and carbon dioxide, as these barrier properties are deficient when a single PET layer is used.

In other exemplary embodiments of the invention, the means of carrying out the invention comprises the laminated wall structure consisting of at least the outer layer of polyethylene or polypropylene and the inner layer of an ethylene vinyl alcohol copolymer or the PET resin. Like the PET resins used in earlier described exemplary embodiments of the invention, the PET resins used include amorphous PET resins.

This laminated wall structure prevents the adsorption of limonene, vitamins, etc., among other effective components of the bottle contents.

In other exemplary embodiments of the invention, the means of carrying out the invention comprises the laminated wall structure consisting of at least the outer layer of polyethylene or polypropylene, the middle layer utilizing a gas barrier resin, and the inner layer of polyethylene or polypropylene.

In this exemplary embodiment of the invention, it is possible to obtain bottles having a high oxygen barrier property.

In other exemplary embodiments of the invention, the means of carrying out the invention comprises the laminated wall structure consisting of at least the outer layer of a nylon resin and the inner layer of polypropylene or polyethylene. The nylon resins usable in this invention include nylon-6, nylon-66, and polyamide containing xylylene radicals.

In this exemplary embodiment of the invention, it is possible to obtain bottles having a high piercing strength and high surface gloss because of the nylon resin used as the outer layer.

Other exemplary embodiments of the invention also comprises the laminated structure consisting of at least the inner and outer layers of a virgin resin material and the middle layer of a regenerated resin material, which makes it possible to utilize regenerated resin materials safely.

In other exemplary embodiments of the invention, the means of carrying out the invention comprises that an antistatic additive is added to the outer layer of the laminated wall structure.

An antistatic agent is added to the outer layer alone. Thus, with a small amount of additive, it is possible to prevent the bottle from being electro-statically charged over the outer surface where electrostatic charge is a problem.

In other exemplary embodiments of the invention, the means of carrying out the invention comprises that a UV-absorbing agent is added to at least one of the layers of the laminated wall structure.

The UV-absorbing agent can be added to the most effective layer in response to the layer configuration and the application of the bottle.

In other exemplary embodiments of the invention, the means of carrying out the invention comprises the laminated wall structure consisting of at least the outer layer of a synthetic resin and the inner layer of another synthetic resin having low compatibility with the synthetic resin used in the outer layer.

The preform in the above configuration can be biaxially stretched and blow molded into a bottle consisting of the outer layer of a synthetic resin, which forms the outer shell of a definite shape, and the inner layer of a synthetic resin, which forms the inner bag, with both layers being laminated in a separable manner. Such a bottle can be used as a delaminating bottle.

In another exemplary embodiment of the invention, the means of carrying out the invention comprises a bottom adhesive layer to adhere and fix the outer layer and the inner layer together over the entire length of the pinch-off portion, which is formed when the portion of parison P corresponding to the bottom shell portion is forced to flatten by the pinch-off section of the split blow mold.

In the above-described configuration, the outer layer and the inner layer are adhered firmly with each other by the bottom adhesive layer over the entire length of the pinch-off portion. Thus, the pinch-off portion can be prevented from being peeled and damaged especially by the stretch pin during the longitudinal stretching when the preform is biaxially stretched and blow molded into a bottle. The molded bottle has its outer and inner layers adhered firmly by the bottom adhesive layer over the entire length of the bottom seal. This bottom structure makes sure of preventing the decrease in the mechanical strength of the bottom seal when such a decrease may be derived from the separable layers of incompatible synthetic resin materials.

In still another exemplary embodiment of the invention, the means of carrying out the invention comprises the laminated wall structure consisting of the outer layer, the inner layer, and at least a vertical slip-like adhesive layer to adhere and fix the outer and inner layers with each other over the entire height of these layers.

When the preform is biaxially stretched and blow molded, the vertical slip-like adhesive layer adheres the outer layer with the inner layer over the entire height. The resultant adhered zone serves to prevent the inner layer from being distorted and deformed in the vertical direction and thereby to prevent the content flow passage from being blocked up in the delaminating bottle.

The placement and the number of the vertical slip-like adhesive layer can be selected, depending on the purpose and necessity. For example, if outside air is sucked up through the bottom into the space between the outer layer and the inner layer, preferably the adhesive layer can be located roughly on the parting line.

Usually, the delaminating bottles are molded by the direct blow method because of its laminated structure. On the contrary, the blow molded preform in certain above-described exemplary configurations of the invention can be biaxially stretched to obtain the bottle having higher strength.

In another exemplary embodiment of the invention, the means of carrying out the invention comprises:
  employing a blow-molded preform so that the preform is molded into a bottle by a biaxially stretching and blow molding means;
  providing the preform with a mouth portion;
  providing the preform with a cylindrical barrel portion from which the barrel is molded;
  providing the preform with a bulging shoulder portion from which the shoulder is molded, disposing this portion between the mouth portion and the barrel portion, and allowing the bulging shoulder portion to have the diameter that widens slightly in the downward direction;
  providing the preform with a bottom shell portion from which the bottom is molded, and forming the bottom shell portion into an almost spherical shape; and
  providing the preform with an inner overhang wall portion an inner overhang wall portion in any position starting from the opposite side of the neck ring, which is disposed circumferentially around the lower part of the mouth portion, and ending at the upper portion of the bulging shoulder portion, with said inner wall portion having a diameter that widens in the downward direction.

Another exemplary means of carrying out the invention comprises:
  employing a blow-molded preform so that the preform is molded into a bottle by a biaxially stretching and blow molding means;
  providing the preform with a mouth portion;
  providing the preform with a cylindrical barrel portion from which the barrel is molded;
  providing the preform with a bulging shoulder portion from which the shoulder is molded, disposing this portion between the mouth portion and the barrel portion, and allowing the bulging shoulder portion to have the diameter that widens slightly in the downward direction;
  providing the preform with a bottom shell portion from which the bottom is molded, and forming the bottom shell portion into an almost spherical shape; and
  providing the preform with a radially widened connecting portion connecting the lower part of the cylindrical barrel portion to the bottom shell portion, with the connecting portion having a larger diameter than the barrel portion.

In still another exemplary embodiment of the invention, the means of carrying out the invention comprises an inner overhang wall portion an inner overhang wall portion disposed in any position starting from the opposite side of the neck ring, which is disposed circumferentially around the lower part of the mouth portion, and ending at the upper portion of the bulging shoulder portion, with the inner wall portion having a diameter that widens in the downward direction.

In yet another exemplary embodiment of the invention, the means of carrying out the invention comprises the reinforcing rib that is disposed under the opposite side of the pinch-off portion in the bottom shell portion.

In certain of the above-described exemplary configurations, thick areas are prevented from occurring in the pinch-off portion and/or in the inner overhang portion in any position starting from the opposite side of the neck ring and ending at the upper portion of the bulging shoulder portion even if the preform is of the single-layer wall structure.

PREFERRED EMBODIMENTS OF THE INVENTION

Figure 1:
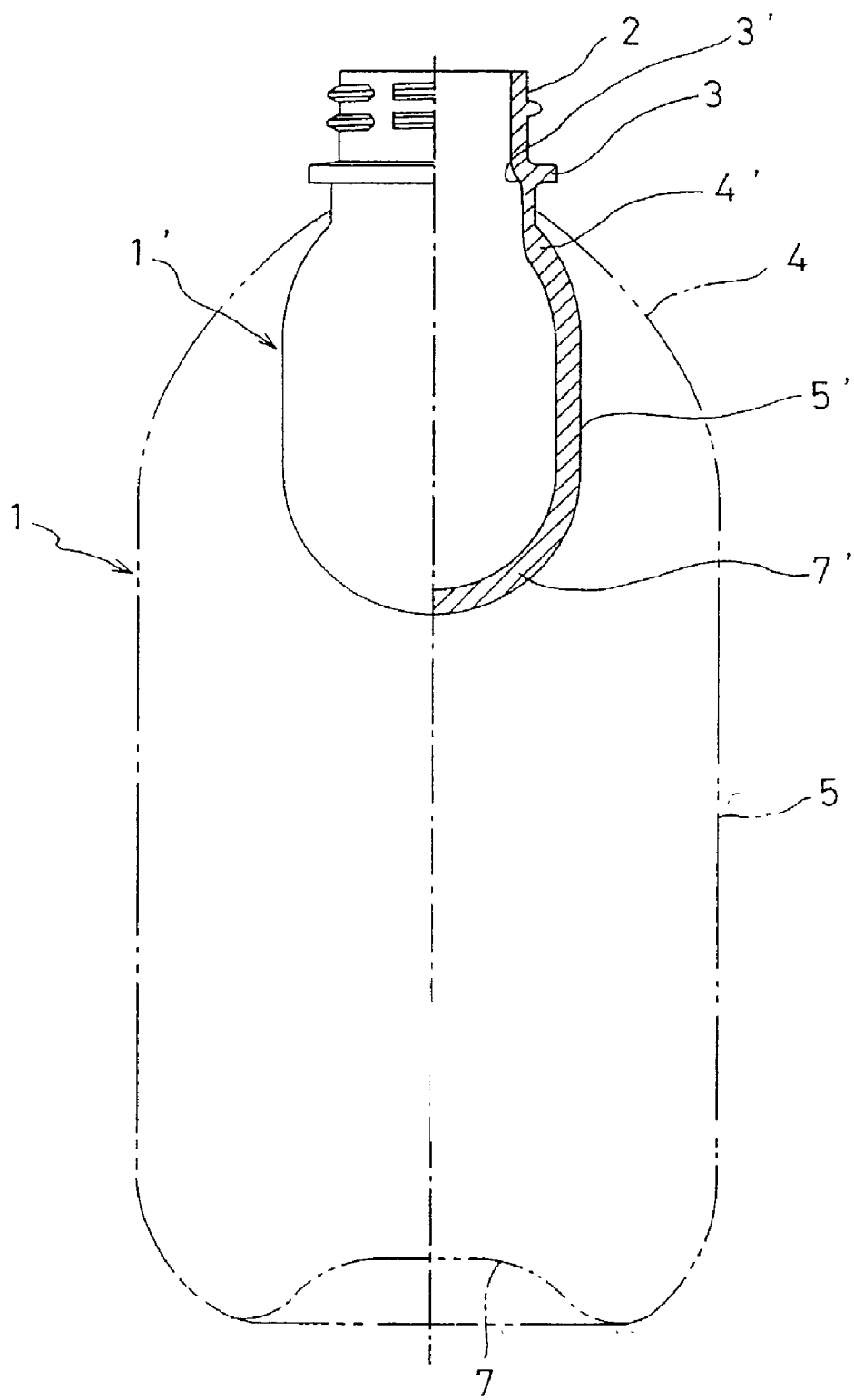
FIG. 1 is an explanatory diagram showing a mode of molding the preform of this invention into a bottle, with the right half being illustrated in longitudinal section.

This invention is further described as to its preferred embodiments, while referring to the drawings. FIG. 1 is an explanatory diagram showing a mode of molding the preform of this invention into a bottle, with the right half being illustrated in longitudinal section. The preform 1' is stretched vertically and laterally into the bottle 1.

Figure 2:
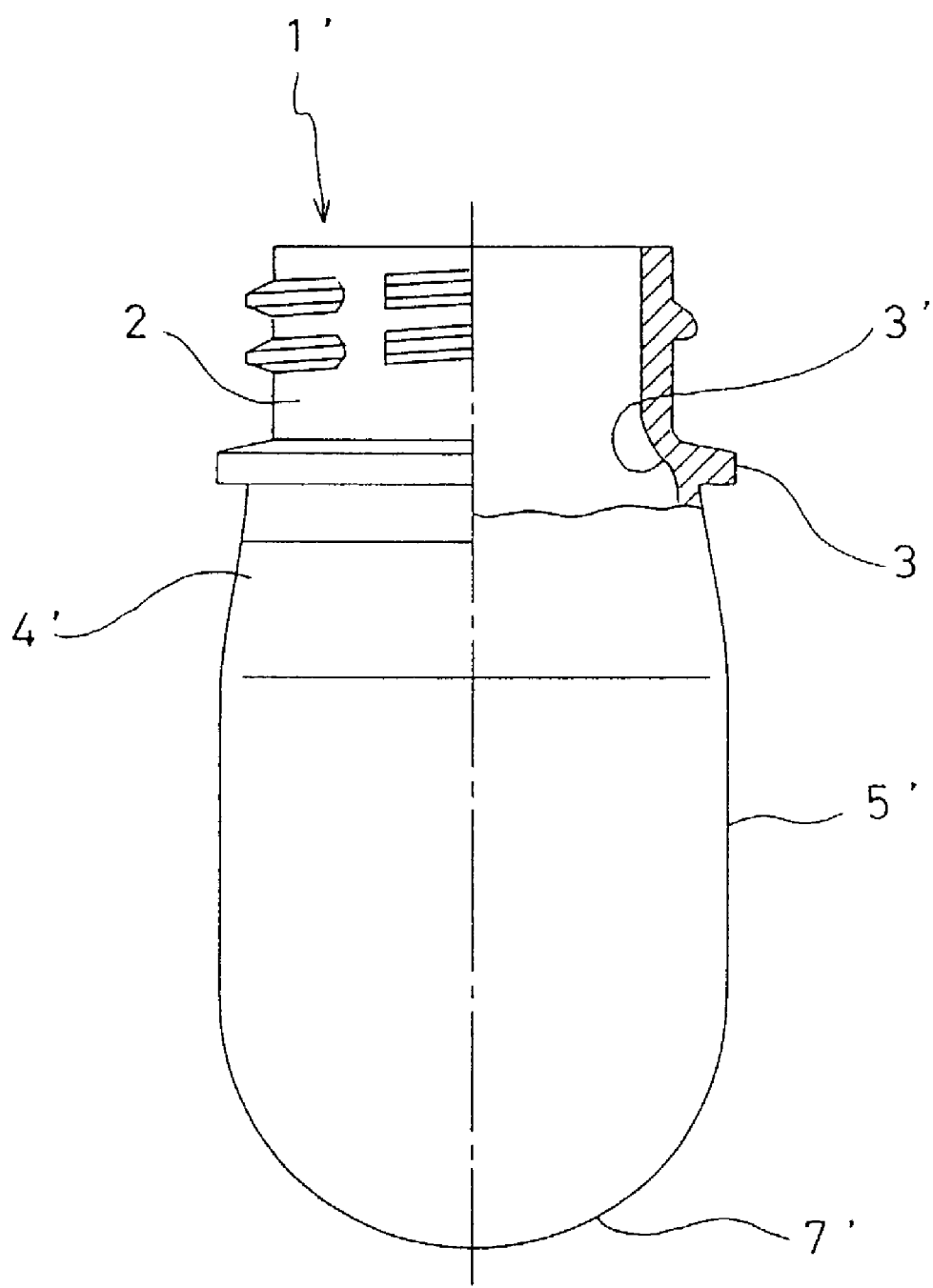
FIG. 2 is a front view, with partial insection, of the entire preform according to the first shape embodiment of this invention, with an important segment being illustrated in longitudinal section.

FIG. 2 is a front view, with partial insection, of the entire preform 1' according to the first shape embodiment of this invention in which the cylindrical, extrusion-molded parison P has been blow molded into the cylindrical preform of this invention having a closed end. Helical ridges are disposed on the outer circumference of the short cylindrical mouth portion, and the neck ring 3 is also disposed around the lower part of the mouth portion. Downward from the mouth portion 2 there is the bulging shoulder portion 4' (the portion to be molded into the shoulder 4 of the bottle 1) having a diameter that widens slightly in the downward direction. Downward from this bulging shoulder portion 4' there is the cylindrical barrel portion 5' (the portion to be molded into the barrel 5 of the bottle 1). Under the barrel portion 5' there is the bottom shell portion 7' (the portion to be molded into the bottom 7 of the bottle 1), which has a shape of almost spherical shell. In addition, the inner overhang wall portion 3' is disposed on the opposite side of the neck ring 3, and has a diameter that widens in the downward direction.

Figure 5:
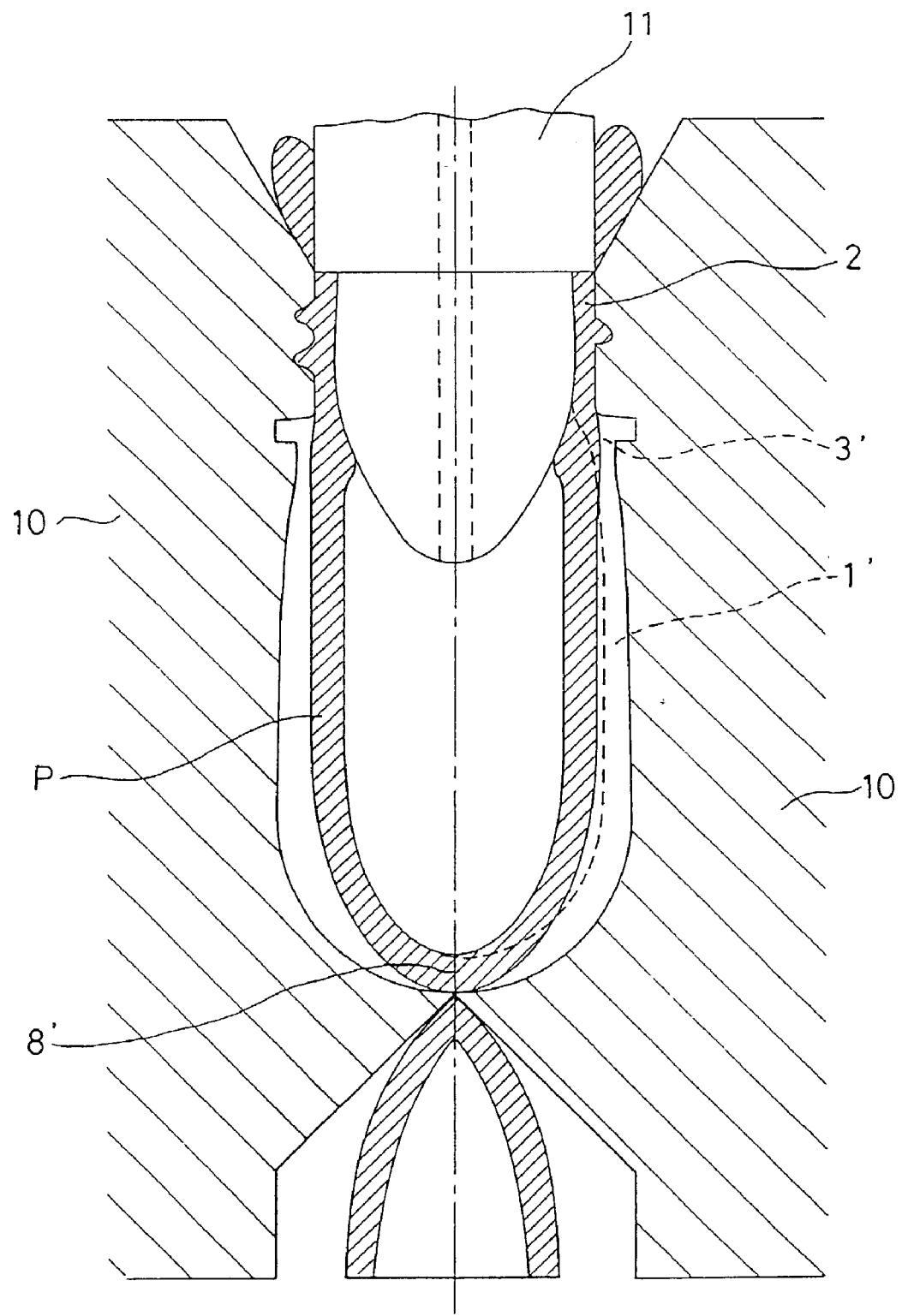
FIG. 5 is an explanatory longitudinal section showing an example of parison to be molded into the preform of this invention.

This inner overhang wall portion 3' is disposed on the inner circumference on the opposite side of the neck ring 3, i.e., on the border between the mouth portion 2 and the bulging shoulder portion 4' to be molded into the shoulder 4 of the bottle 1. The diameter of this portion 3' widens in the downward direction. Prior to the blow molding of parison P into the preform 1', a core guide 11 equipped with an air blow nozzle is thrust into the upper end of the parison P to form the mouth portion 2 (See FIG. 5). At that time, a thick area tends to be formed in the lower part of the inner wall of the mouth portion 2 because of the core guide 11 that has been thrust. This thick area is absorbed in the inner overhang wall portion 3' when the parison is blown molded into the preform. Thus, the thick area is actually never formed in the lower part of the inner overhang wall under the mouth portion 2.

Figure 3:
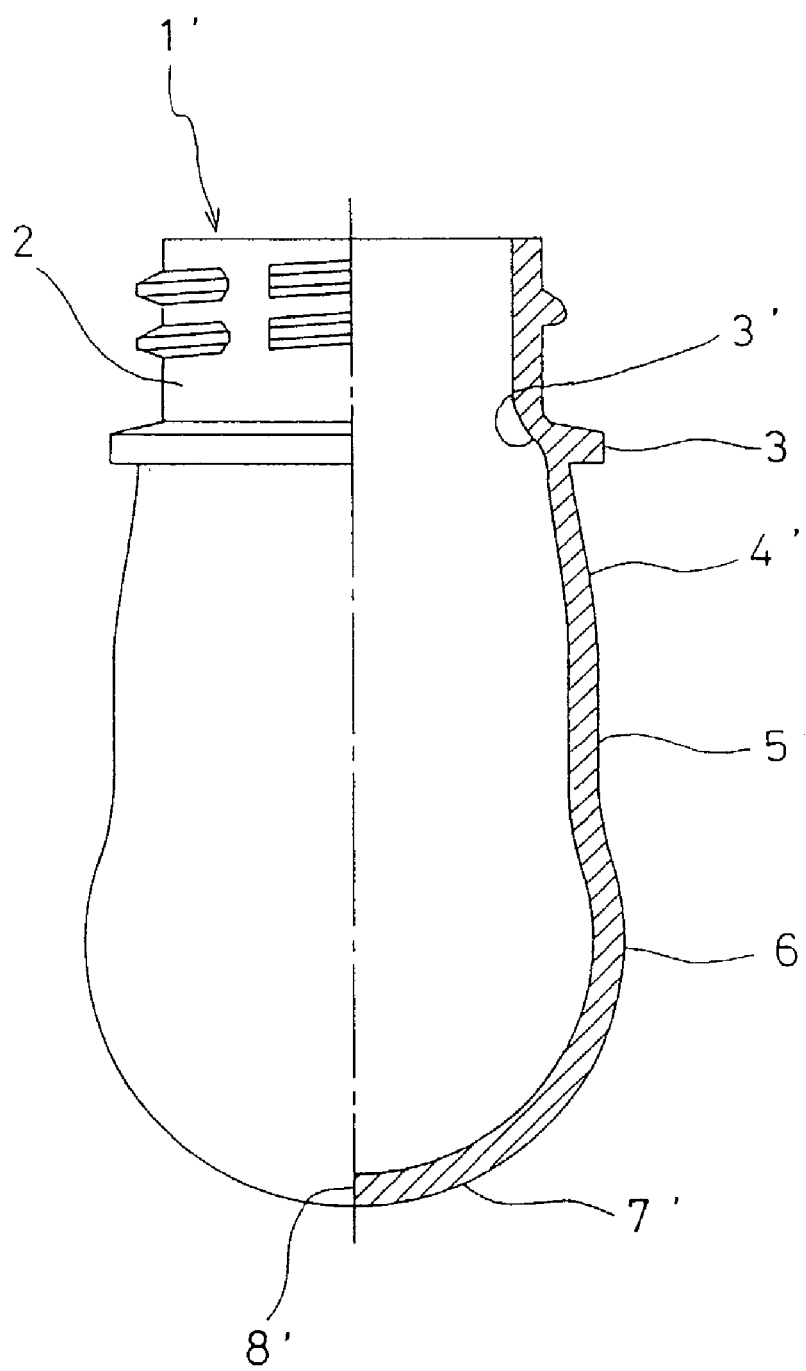
FIG. 3 is a front view of the entire preform according to the second shape embodiment of this invention, with the right half being illustrated in longitudinal section.

FIG. 3 shows the preform 1' according to the second shape embodiment of this invention. It is a front view of the entire preform with the right half being illustrated in longitudinal section. The short, cylindrical mouth portion 2 is provided with helical ridges on the outer circumference and with the neck ring 3 at the lower part of the outer circumference. The bulging shoulder portion 4' is disposed under the mouth portion 2, and has a diameter that widens slightly in the downward direction. The cylindrical barrel portion 5' is disposed between the shoulder portion 4' and the bottom shell portion 7' of an almost spherical shell shape. The radially widened connecting portion 6' is disposed under the barrel portion 5' and is by itself the upper portion of this bottom bulb portion 7', with this radially widened connecting portion having a larger diameter than that of the barrel portion 5'.

This radially widened connecting portion 6' slightly bulges from under the barrel portion 5' at a position close to the bottom shell portion 7', where the pinch-off portion 8' is disposed right at the bottom center. When the parison is blow molded into the preform, the radially widened connecting portion 6' is stretched and deformed along with the bottom shell portion 7' to the last moment of the molding operation. As a result, the thick pinch-off portion 8' is also stretched to a large extent, and no thick area is formed in the bottom.

Figure 4:
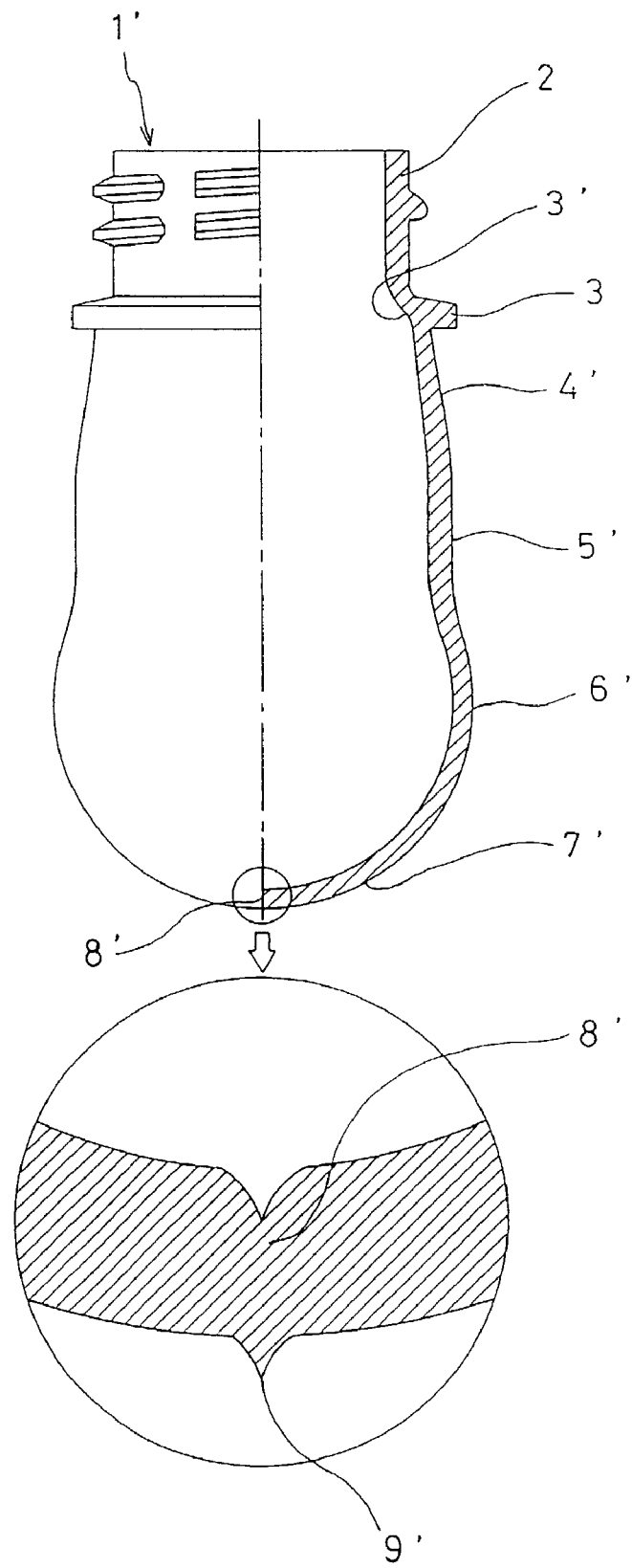
FIG. 4 is a front view of the entire preform according to the third shape embodiment of this invention, with the right half and the partially enlarged pinch-off portion being illustrated in longitudinal section.

FIG. 4 shows the preform 1' according to the third shape embodiment of this invention. It is a front view of the entire preform with the right half being illustrated in longitudinal section. It also shows a partially enlarged, longitudinal section of the pinch-off portion 8'. The preform has the inner overhang wall portion 3' and the radially widened connecting portion 6'. In addition, a ridge-like reinforcing rib 9' is disposed right under the bottom shell portion 7' of this preform.

Because of the inner overhang wall portion 3', no thick area is formed in the wall under the mouth portion 2. Likewise, because of radially widened connecting portion 6', the pinch-off portion 8' of the bottom shell portion 7' does not get thick and thus does not show any wrong movement during the blow molding operation. Furthermore, even if a sink mark is formed due to the welding failure in the parison P, the reinforcing rib can make up for the decrease in the weld area caused by this sink mark. When the preform is biaxially stretched and blow molded into a bottle, the reinforced pinch-off portion 8' can be blow molded without rupture.

Figure 6:
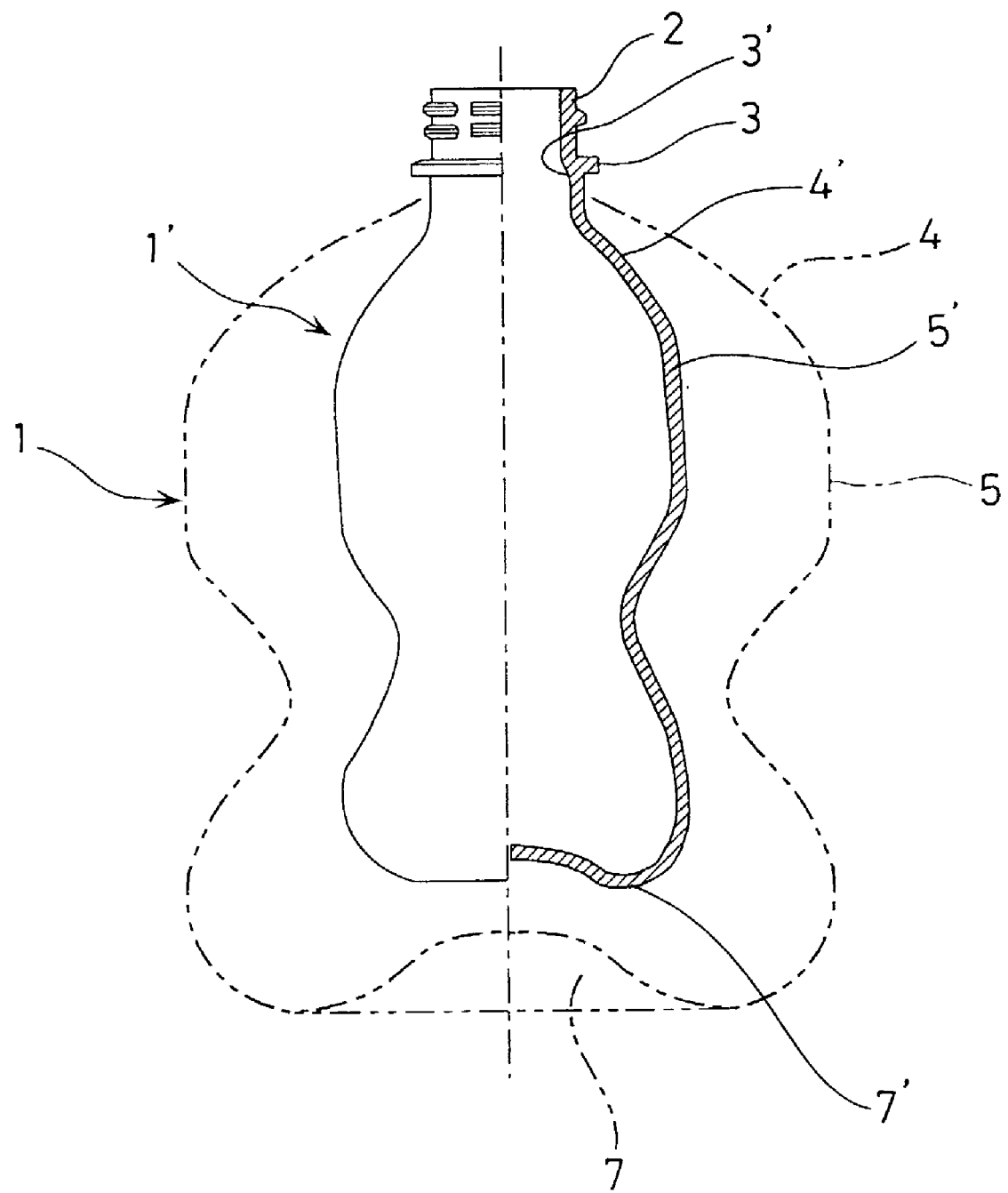
FIG. 6 is an explanatory diagram showing the preform according to the fourth shape embodiment of this invention and the bottle to be molded therefrom, with the right half being illustrated in longitudinal section.

FIG. 6 is an explanatory diagram showing the preform 1' in the fourth shape embodiment of this invention and the bottle 1 that is biaxially stretched and blow molded from this preform.

The bottle 1 has a shape in which the barrel and the bottom are largely caved inward and upward, respectively. The bulging shoulder portion 4', the cylindrical barrel portion 5', and the bottom shell portion 7' has a shape similar to the shoulder 4, the barrel 5, or the bottom 7 of a bottle 1, but on a reduced scale. The preform 1' also has such a shape that it gives a small percent of stretch in the vertical direction when it is biaxially stretched and blow molded.

The preform 1' of such a shape is allowed to have low percent of stretch in the vertical direction when the preform is biaxially stretched and blow molded. Even after the preform has been stretched by means of the stretch pin, each portion of the stretched preform has a shape similar to the respective portion of the bottle 1 on a reduced scale. In the next step of lateral stretch, the percent of stretch can be set at a constant level for each portion. Thus, even a bottle of the largely caved shape can be faithfully reproduced, and the bottle 1 has high stability, good moldability, and uniform wall thickness.

Because the preform 1' has the inner overhang portion 3', no thick area is formed in the inner wall under the mouth portion 2. The bottom shell portion 7' and the lower part of the cylindrical barrel portion 5' have been subjected to widened deformation and expanded deformation to give the shapes of the bottom 7 and the barrel 5 of the bottle 1 on a reduced scale. Thus, the thick pinch-off portion 8', too, is stretched and does not remain thick.

Figure 7:
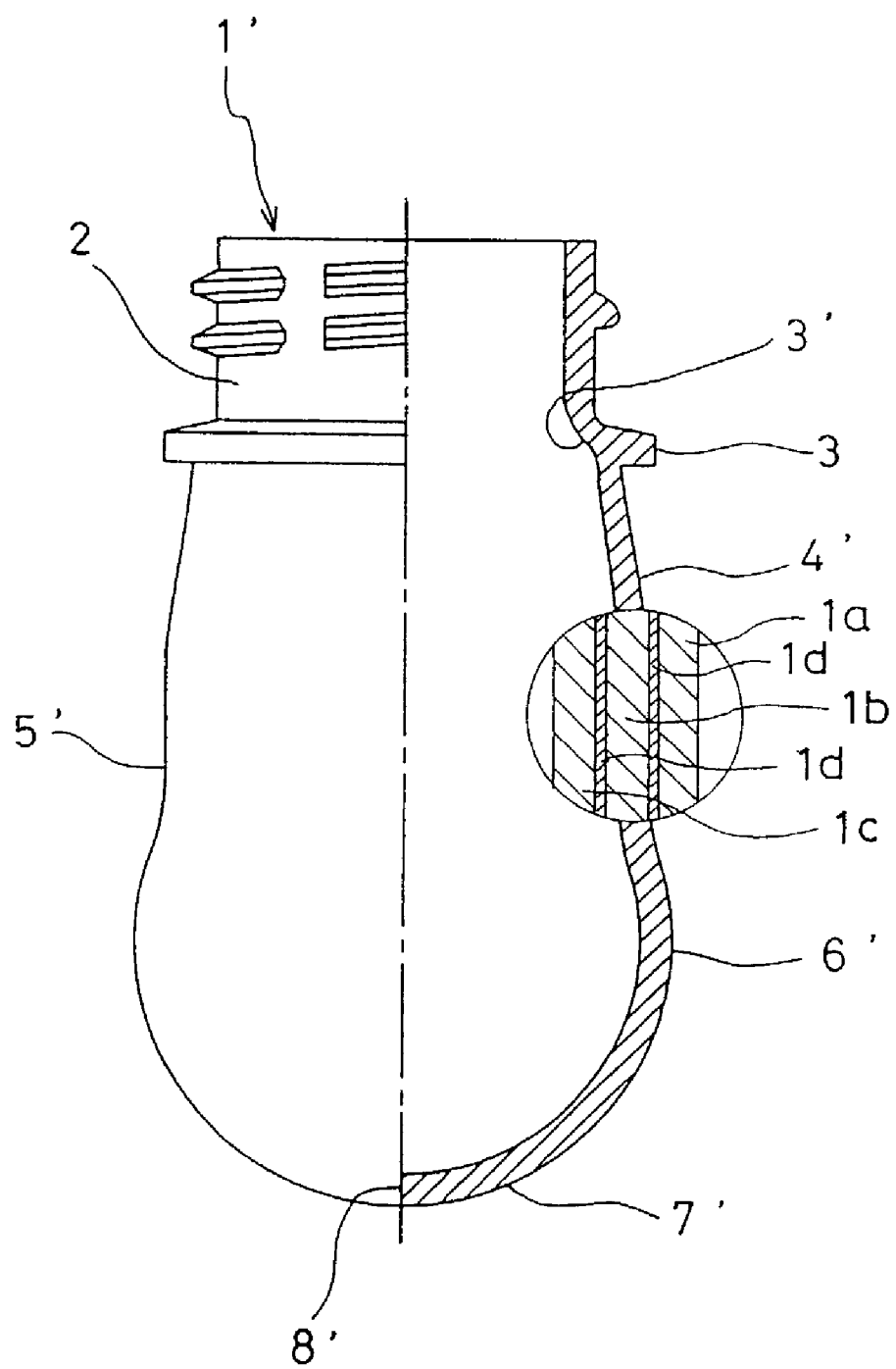
FIG. 7 is a partially enlarged front view of the entire preform of this invention, with the right half being illustrated in longitudinal section.

The preform in each embodiment has a laminated wall structure. An example is as shown in FIG. 7. However, since the preform 1' is a blow molded article, the preform of the laminated structure can be readily molded with high precision.

The preform 1' of the laminated wall structure in the first embodiment of the laminated wall structure comprises the combinations of PET and PEN layers. The first combination comprises the outer PET layer 1a and the inner PEN layer 1c. The second combination comprises the outer PET layer 1a, the middle PEN layer 1b, and the inner PET layer 1c. The third combination comprises the outer PEN layer 1a and the inner PET layer 1c. The fourth combination comprises the outer PEN layer 1a, the middle PET layer 1b, and the inner PEN layer 1c. Each combination can also be provided with an adhesive layer or layers 1d between these layers.

In order for the preform to have good moldability and for the molded bottles to have high mechanical properties, the PET in use should preferably have an inherent viscosity value (hereinafter referred to as IV value) at 0.9 or more. Likewise, the PEN in use should preferably have an IV value of 0.5 or more. Although PET and PEN resins containing a copolymer component can be used, it is preferred to use a PET resin with an IV value of 0.75 or more in the case of amorphous PET.

For all the configurations in the first embodiment of the laminated wall structure, heat-resistant bottles can be obtained without crystallizing the mouth portion. The heat set during stretching and blowing gives the heat-resisting property to the bottles, when the PEN layer occupies 50% or more of the entire thickness at the mouth and 50% or less at the barrel. If a PEN resin containing a copolymer component is used, it is necessary to design the thickness of the mouth portion in response to the PEN component to be used. For example, in the case of a PEN resin containing 51% PEN component, it is preferred that the PEN resin layer occupies 90% or more of the entire thickness at the mouth.

PEN is used as the inner layer 1c in the first and fourth combinations of the first embodiment of the laminated wall structure. This gives the bottles high chemical-resisting property (high resistance to alkalis). The PEN layer can be 1–20% in its thickness. The PEN layer containing a copolymer can also be utilized.

All the configurations in the first embodiment of the laminated wall structure of this invention allow the bottle to have a UV-cutting function for the UV rays having a wavelength of 370 nm or below, when the thickness of the PEN layer is set at 1–20%.

The preform 1' of the laminated wall structure in the second embodiment of the laminated wall structure comprises the combinations of the outer and inner PET layers 1a and 1c with the middle layer 1b using a gas barrier resin. The first combination comprises the middle layer 1b of an ethylene vinyl alcohol copolymer. The second combination comprises the middle layer 1b of polyamide containing the xylylene radicals, and the third combination comprises the middle layer 1b of polyacrylonitrile, with the adhesive layer or layers 1d being laid between these layers.

This second embodiment of the laminated wall structure allows the bottle 1 to have barrier properties against oxygen and carbon dioxide, as the barrier is insufficient in the case of a single PET layer. In addition, the bottle 1 with no interlaminar separation can be obtained without fail. In order that the content can be prevented effectively from oxidation, it is preferred from an effectiveness point of view to use a gas barrier resin having an oxygen transmission coefficient of 1 cc.mm/m$^2$.day.atm (20° C. 50% RH) or less.

The preform 1' of the laminated wall structure in the third embodiment of the laminated wall structure comprises the outer layer 1a of polyethylene or polypropylene and the inner layer 1c of an ethylene vinyl alcohol copolymer or PET, adhered with each other by the adhesive layer 1d. The bottle 1 in this embodiment prevents effective ingredients of the content, such as limonene and vitamins, from being absorbed by the bottle 1.

The preform 1' of the laminated wall structure in the fourth embodiment of the laminated wall structure comprises the outer layer 1a of polyethylene or polypropylene, the middle layer 1b using, as a gas barrier resin, the polyamide having xylylene radicals, and the inner layer 1c of polyethylene or polypropylene, adhered with one another by the adhesive layers 1d. This configuration gives the bottle 1 a high oxygen barrier property.

The preform 1' of the laminated wall structure in the fifth embodiment of the laminated wall structure comprises the outer layer 1a of nylon-6 and the inner layer 1c of polyethylene or polypropylene, adhered with each other by the adhesive layer 1d. This embodiment gives the thin bottle 1 having a high piercing strength and high surface gloss.

The preform 1' of the laminated wall structure in the sixth embodiment of the laminated wall structure comprises the outer and inner layers 1a and 1c made of a virgin PET resin and the middle layer 1b made of a regenerated PET resin. This embodiment makes it easy to control the layer thickness, and enables the regenerated resin materials to be safely utilized. When bottles are collected separately, they can be dealt with as the single-layer PET bottles.

The preform 1' of the laminated wall structure in the seventh of the laminated wall structure embodiment comprises the outer PET layer 1a containing an anti-static agent, the middle PET layer 1b containing a UV-absorbing agent, and the inner layer 1c of a virgin PET resin material. The preform gives effective antistatic property, and there is no loss of the UV-absorbing agent caused by bleed-out because it is added to the middle layer. The bottle can be filled with the content safely in spite of these additives used in the bottle.

FIGS. 8–11 show the preform of the laminated wall structure in the 8th embodiment of the laminated wall structure of the invention. The wall comprises the outer layer 1a of a synthetic resin material, such as polyethylene, polypropylene, or polyethylene terephthalate, to be molded as the outer shell that has a necessary shape-retaining ability; the inner layer 1c of a synthetic resin material, such as nylon, ethylene vinyl alcohol copolymer, or polyethylene terephthalate, which is less compatible with the material of the outer layer 1a and which is molded into a bag capable of deflective deformation; and the vertical slip-like adhesive layer 13 and the bottom adhesive layer 14 of an adhesive resin having a full adhesive property for both of the outer and inner layers 1a and 1c.

Figure 8:
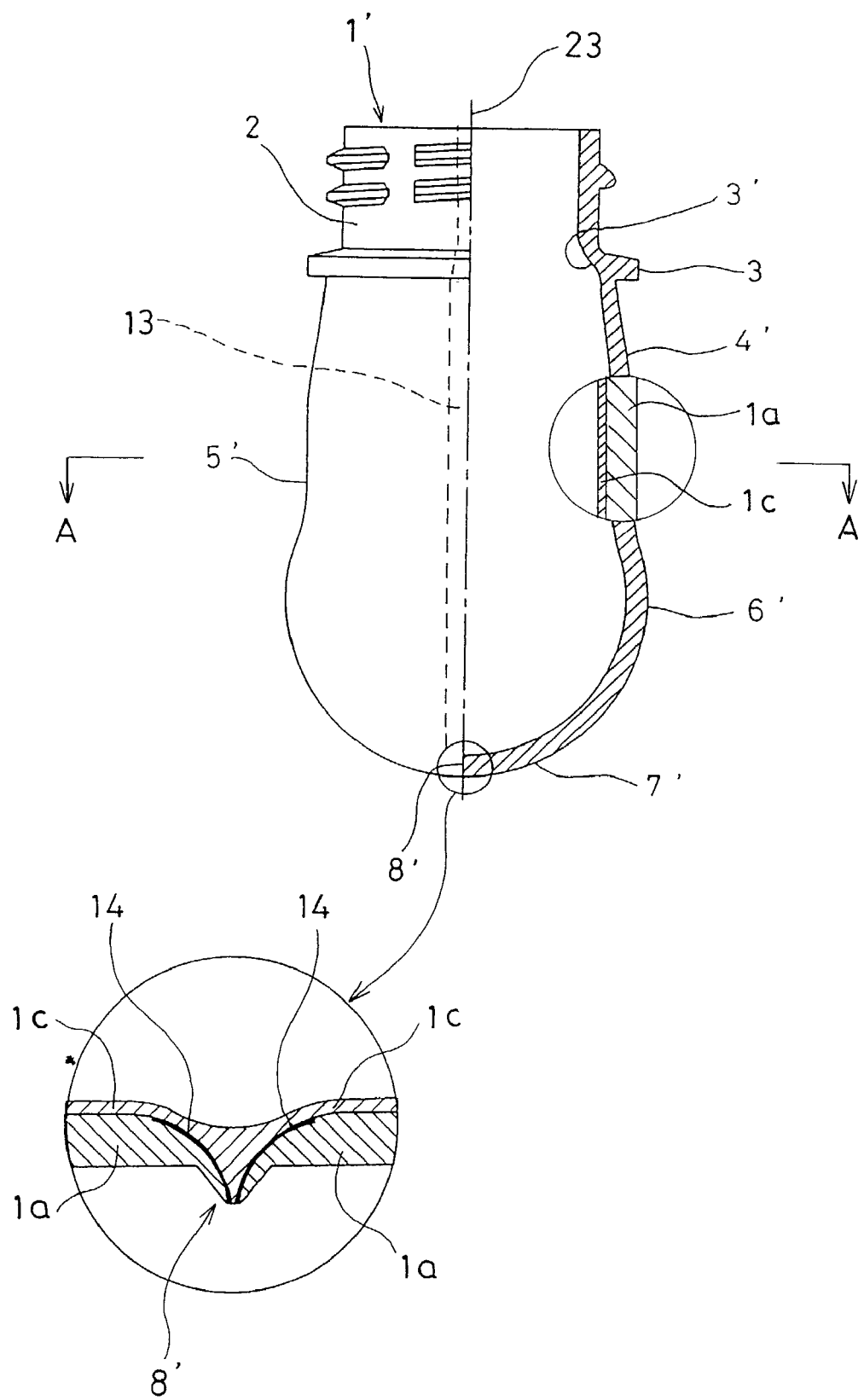
FIG. 8 is a partially enlarged front view of the entire preform of the laminated wall structure according to the eighth embodiment of the laminated wall structure of the invention, with the right half being illustrated in longitudinal section.
Figure 9:
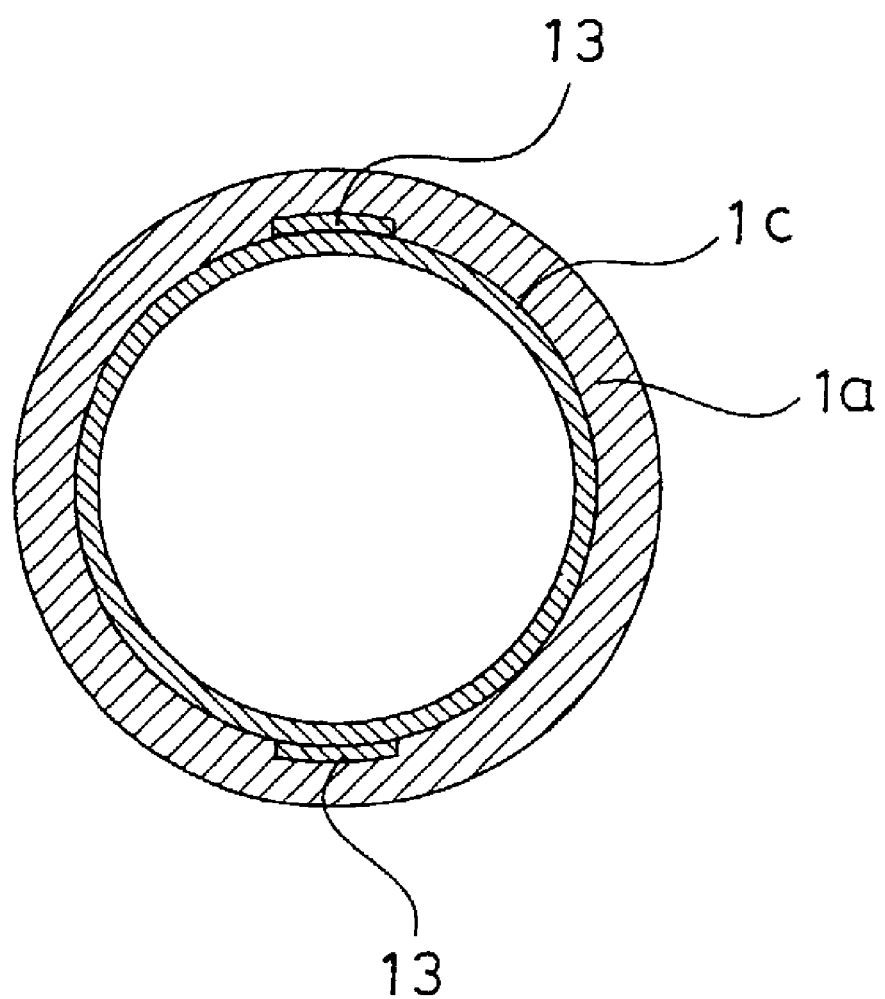
FIG. 9 is a plane cross-sectional view of the preform of this invention cut from line A—A in FIG. 8.
Figure 10:
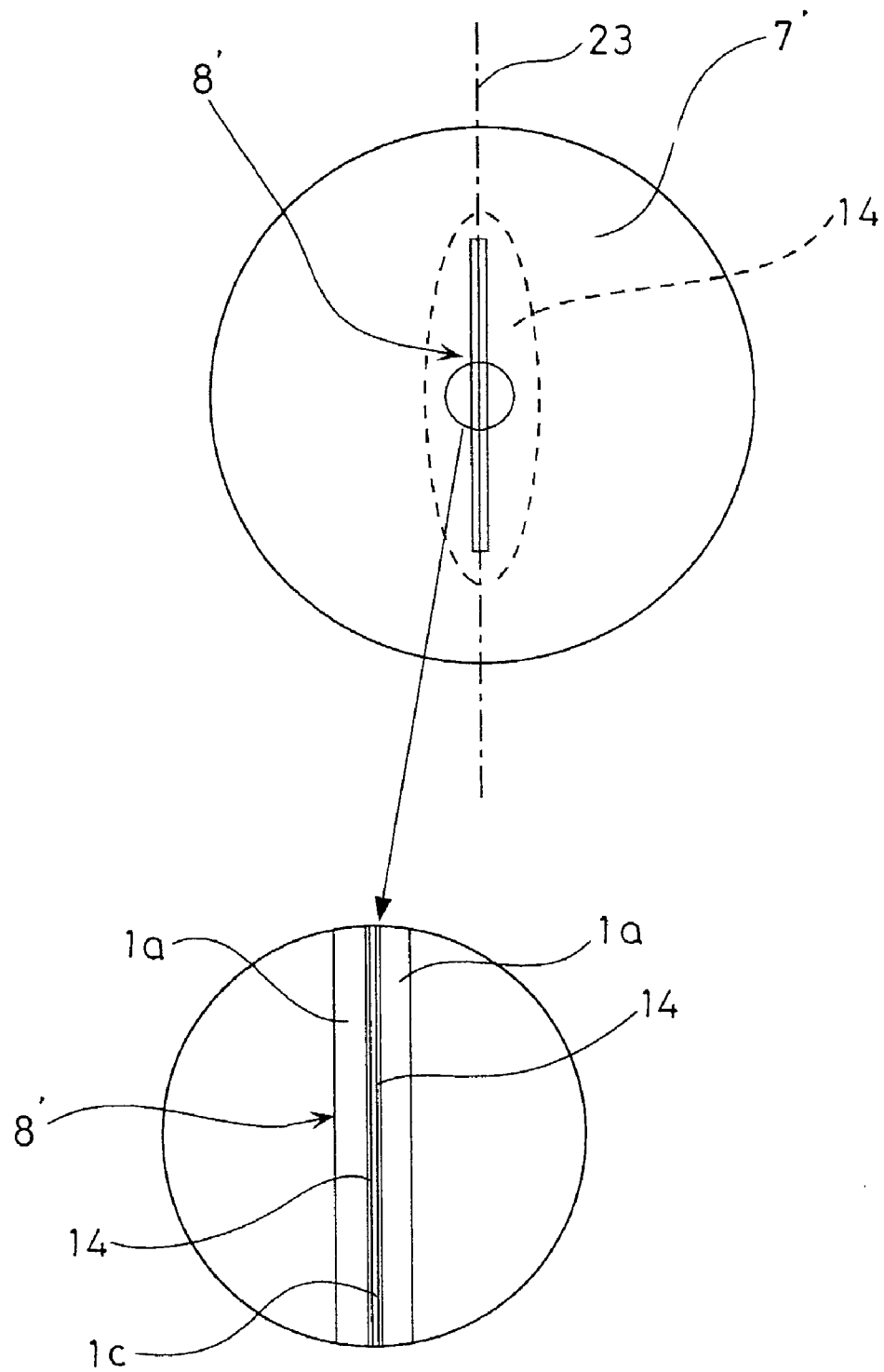
FIG. 10 is a partially enlarged plane view of the preform bottom in the laminated structure according to this invention.
Figure 11:
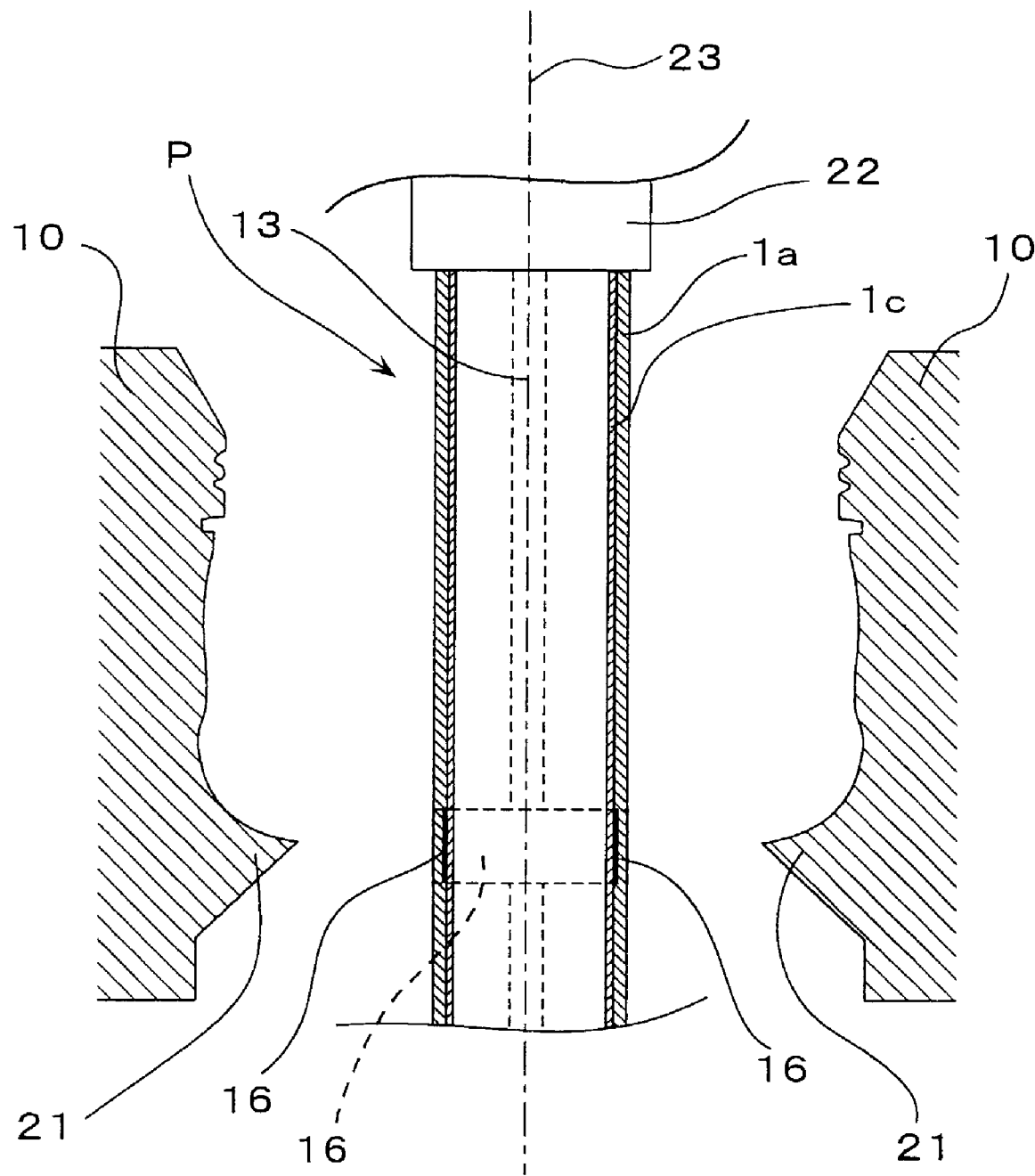
FIG. 11 is an explanatory diagram showing the process for blow molding the parison into the preform according to the eighth embodiment of the laminated wall structure of this invention.

A pair of the vertical slip-like adhesive layers 13 is disposed at the positions opposite to each other on the parting line 23 (See FIGS. 8 and 9).

The bottom adhesive layer 14 has some spread from the pinch-off portion 8' to a part of the bottom shell portion 7'. The bottom adhesive layer 14 adheres and fixes the outer and inner layers, 1a and 1c, to each other at the pinch-off portion 8', where the outer layer 1a on one side is integrated with the outer layer 1a on the other side through the bottom adhesive layer 14 and the inner layer 1c. (See FIGS. 8 and 10.)

Although the preform 1' comprises the outer and inner layers, 1a and 1c, of synthetic resins that are less compatible with, and peelable from, each other, the decrease in mechanical strength of the bottom seal at the pinch-off portion 8' can be prevented securely by the bottom adhesive layer 14 when this preform 1' is biaxially stretched and blow molded into the bottle 1. The inner layer 1c is deformed inward due to the deflection caused by the decrease in content as the content is poured out. This deflective deformation is controlled in the vertical direction by the pair of vertical slip-like adhesive layers 13, which are disposed in axial symmetry to adhere and fix the outer and inner layers, 1a and 1c, over the entire height of the bottle 1. These adhesive layers also prevent the content flow passage from being blocked, thus enabling the content to be poured out of the delaminated bottle 1 to the last drip.

The preform 1' provided with the vertical slip-like adhesive layer 13 and bottom adhesive layer 14 can be prepared by the process described below. (See FIG. 11) The multi-layer parison P is molded by co-extruding, from the dies 22 for multi-layer parison use, the multi-layers comprising the cylindrical outer layer 1a, the cylindrical inner layer 1c located inside the outer layer 1a, a pair of the vertical slip-like adhesive layers disposed in axial symmetry on the parting line 23, and the cylindrical ring-like adhesive layer 16 that is disposed between the outer layer 1a and the inner layer 1a intermittently at a predetermined interval.

In contrast to the outer layer 1a, the inner layer 1c, and a pair of the vertical slip-like adhesive layers, all of which are co-extruded continuously, the ring-like adhesive layer 16 is co-extruded, not continuously but intermittently, by the controlled pressurization and depressurization of the accumulator with which the resin feed section is equipped for the ring-like adhesive layer.

The pinch-off section of the split blow mold 10 pinches off the multi-layer parison P thus molded, laterally in the area where the ring-like adhesive layer 16 has been formed. When the cut parison is blow molded, this ring-like adhesive layer 16 develops into the bottom adhesive layer 14, such as described in the preform 1' of the laminated wall structure in the eighth embodiment of this invention.

The bottle 1 obtained by the biaxially stretching and blow molding means has a higher strength than the strength of the bottle 1 made by the direct blow because the former bottle is not only blown but also stretched.

The percent of stretch in the stretching and blow molding operation can be properly selected, depending on purpose, necessity, and the co-stretchability of each resin with which the laminated structure is organized. However, the percent of stretch in the longitudinal direction can be set at a low level so as to prevent the bottom from cracking due to the vertical stretching.

This invention in the above-described configurations has the following effects.

No thick area is formed in the portion to be molded into shoulder and/or in the portion to be molded into the bottom of the bottle. As a result, the entire bottle can be molded with high precision of wall thickness to give the bottle having good appearance and no defective distortion.

The preform has been blow molded so that the cylindrical barrel portion is stretched and deformed, and the bottom shell portion has widened in diameter. With this configuration, the preform of this invention shows high molding stability when it is biaxially stretched and blow molded into the bottle. Since the stretch is given to an extent enough to mold the bottom, the bottom in a stable sitting position can be molded without fail.

The bottle with laminated wall can be produced easily and securely, thus enabling the bottle to have desired physical properties and to make effective use of the material characteristics. Since the preform is a blow-molded article, it can be more readily molded in the laminated structure than when the preform is produced by the injection molding.

Because the bottom shell portion has a roughly spherical shape in various exemplary embodiments of the invention, it is possible to obtain the preform that have been isotropically widened and deformed, merely by using the mold of a simple shape. Especially in the bottle having a bottom of a roughly isotropic cross section, the bottom of the preform is stretched almost uniformly in the circumferential direction. Therefore, there is no case where this distortion caused by the molding may deteriorate the appearance and shape of the bottle or where the bottom loses its stable sitting function.

In other exemplary embodiments of the invention, the preform comprises the bottom shell portion of a roughly spherical shape and a radially widened connecting portion of an arced shape, and this connecting portion has a larger diameter than the barrel portion so that this portion makes an arc. With this configuration, the parison can be blow molded in a mold of a simple shape to form the isotropically widened bottom shell portion and the connecting portion. Especially in the bottle having the bottom of a roughly isotropic cross section, the bottom and the connecting portion of the preform are stretched almost uniformly in the circumferential direction. Therefore, there is no case where this distortion caused by the molding may deteriorate the bottle appearance and shape or where the bottom loses its stable sitting function.

In still other exemplary embodiments of the invention, the preform is given partly or entirely a bottle-like shape on a reduced scale. Such a shape gives the preform more uniform percent of stretch than usual, when the preform is biaxially stretched and blow molded into a bottle. Even if the bottle has a complicated shape, such as being largely non-isotropic or having a shape with various ups and downs, there can be obtained a less deformed bottle of uniform thickness with high stability and good moldability.

When a sink mark appears in the pinch-off portion because of insufficient weld strength caused by a welding failure, the preform in various exemplary embodiments of the invention makes up for this defective portion fully and reliably. Since it is possible to enhance fully the weld strength at the pinch-off portion and the effect of preventing interlaminar separation, the preform can be biaxially stretched and blow molded into the bottle safely and smoothly.

In other exemplary embodiments of the invention, the PET resin layer is combined with the PEN resin layer. This combination serves to enhance effectively the properties that seem to be deficient in the PET resin, such as thermal resistance, resistance to chemicals, and the UV-cutting property.

In other exemplary embodiments of the invention, there is obtained a bottle having enhanced barrier properties against oxygen and carbon dioxide, by using the middle layer of a gas barrier resin, as these barrier properties are deficient when a single PET layer is used.

In still other exemplary embodiments of the invention, the ethylene vinyl alcohol copolymer is used for the inner layer. The bottle 1 in this embodiment prevents effective ingredients of the content, such as limonene and vitamins, from being absorbed by the bottle 1.

In various other exemplary embodiments of the invention, the middle layer of a gas barrier resin makes it possible to obtain the bottle of a polyolefin resin having a high barrier property against oxygen.

In other exemplary embodiments of the invention, the preform comprises the outer layer of a nylon resin. This embodiment gives the bottle having a high piercing strength and high surface gloss.

In other exemplary embodiments of the invention, the preform has the laminated wall structure consisting of the outer and inner layers of a virgin resin material and the middle layer of a regenerated resin material. The regenerated resin can be utilized safely in this structure.

In other exemplary embodiments of the invention, an anti-static additive is added to the outer layer alone. Thus, with a small amount of additive, it is possible to prevent the bottle from being electro-statically charged over the outer surface where electrostatic charge is a problem.

In still other exemplary embodiments of the invention, the UV-absorbing agent can be added to the most effective layer in response to the layer configuration and the application of the bottle.

In various other exemplary embodiments of the invention, the laminated wall structure consists of the outer layer of a synthetic resin and the inner layer of another synthetic resin having low compatibility with the synthetic resin used in the outer layer. In this configuration, it is possible to obtain a bottle consisting of the outer layer of a synthetic resin, which forms the outer shell of a definite shape, and the inner layer of a synthetic resin, which forms the inner bag, with both layers being laminated in a separable manner. Such a bottle can be used as a delaminating bottle.

In other exemplary embodiments of the invention, the laminated wall structure also comprises the bottom adhesive layer that adheres firmly the outer layer and the inner layer with each other over the entire length of the pinch-off portion. In this configuration, the pinch-off portion can be prevented from being peeled and damaged especially during the longitudinal stretching. The bottom adhesive layer also makes sure that the delaminating bottle is prevented from the decrease in the mechanical strength of the bottom seal.

In other exemplary embodiments of the invention, the laminated wall structure also comprises the vertical slip-like adhesive layer or layers that adhere the outer layer with the inner layer over the entire height. The resultant adhered zone or zones serve to prevent the inner layer from being deflected and deformed in the vertical direction and thereby to prevent the content flow passage from being blocked up in the delaminating bottle.

In still other exemplary embodiments of the invention, even the preform of the single-layer wall structure has no thick area in the pinch-off portion and/or in the inner overhang portion in any position starting from the opposite side of the neck ring and ending at the upper portion of the bulging shoulder portion. It is also possible for the single-layer preform to have the fully enhanced weld strength for the pinch-off portion.

What is claimed is:

1. An extrusion blow-molded synthetic resin preform, said extrusion preform comprising:
   a mouth portion;
   a cylindrical barrel portion from which a barrel is molded;
   a bulging shoulder portion, said bulging shoulder portion existing between the mouth portion and the cylindrical barrel portion and having a diameter that widens in the downward direction;
   a bottom shell portion for molding a bottom, said bottom shell portion having a widened and curved shape;
   a radially widened connecting portion connecting the lower part of the cylindrical barrel portion with the bottom shell portion, said radially widened connecting portion having a larger inner diameter than the barrel portion, wherein said extrusion preform has a wall of a plurality of laminated layers.

2. The synthetic resin preform according to claim 1, wherein the bottom shell portion, from which the bottom is molded, has an almost spherical shape and wherein the radially widened connecting portion is provided by widening the diameter downward at the lower part of the cylindrical barrel portion where this portion is connected to the bottom shell portion.

3. The synthetic resin preform, according to claim 2, wherein the preform comprises an inner overhang wall portion located in any position on an interior of the preform starting from the opposite side of a neck ring, which is disposed circumferentially around a lower part of the mouth portion, and ending at an upper portion of the bulging shoulder portion, with said inner wall portion having a diameter that widens in the downward direction.

4. The synthetic resin preform, according to claim 2, wherein a reinforcing rib is projected from under the downside of a pinch-off portion in the bottom shell portion.

5. The synthetic resin preform, according to claim 3, wherein a reinforcing rib is projected from under the downside of a pinch-off portion in the bottom shell portion.

6. The synthetic resin preform according to any one of claims 1–3, 4 and 5, wherein the preform has the laminated wall structure consisting of at least a polyethylene terephthalate resin layer and a polyethylene naphthalate resin layer.

7. The synthetic resin preform according to any one of claims 1–3, 4 and 5, wherein the preform has a laminated wall structure consisting of at least outer and inner layers of polyethylene terephthalate and a middle layer of a gas barrier resin.

8. The synthetic resin preform according to any one of claims 1–3, 4 and 5, wherein the preform has a laminated wall structure comprising at least an outer layer of polyethylene or polypropylene and an inner layer of an ethylene vinyl alcohol copolymer or a polyethylene terephthalate resin.

9. The synthetic resin preform according to any one of claims 1–3, 4 and 5, wherein the preform has a laminated wall structure consisting of at least an outer layer of polyethylene or polypropylene, a middle layer of a gas barrier resin, and an inner layer of polyethylene or polypropylene.

10. The synthetic resin preform according to any one of claims 1–3, 4 and 5, wherein the preform has the laminated wall structure consisting of at least the outer layer of nylon and the inner layer of polypropylene or polyethylene.

11. The synthetic resin preform according to any one of claims 1–3, 4 and 5, wherein the preform has a laminated wall structure consisting of at least outer and inner layers of a virgin resin material and a middle layer of a regenerated resin material.

12. The synthetic resin preform according to any one of claims 1–3, 4 and 5, wherein an outer layer of the laminated wall contains an antistatic additive.

13. The synthetic resin preform according to any one of claims 1–3, 4 and 5, wherein an outer layer of the laminated wall contains a UV-absorbing agent.

14. The synthetic resin preform according to any one of claims 1–3, 4 and 5, wherein the preform has a laminated wall structure consisting of at least an outer layer of a synthetic resin and an inner layer of another synthetic resin having low compatibility with the synthetic resin used in the outer layer.

15. The synthetic resin preform according to claim 14, wherein the preform has a laminated wall structure consisting of the above-described outer and inner layers and a bottom adhesive layer to adhere these layers over an entire length of a pinch-off portion, which is formed when a portion of a parison corresponding to the bottom shell portion is forced to flatten by a pinch-off section of a split blow mold.

16. The synthetic resin preform according to claim 14, wherein the preform has a laminated wall structure consisting of an outer layer and an inner layer and also comprising at least an adhesive layer of a vertical slip to adhere these layers over an entire height of the preform.

17. An extrusion blow-molded synthetic resin preform for molding a bottle by a biaxially stretching and blow molding means, said extrusion preform comprising:

a mouth portion having a neck ring;

a cylindrical barrel portion from which a barrel is molded;

a bulging shoulder portion to be molded into a shoulder, said bulging shoulder portion existing between said neck ring and said cylindrical barrel portion and said bulging shoulder portion having a diameter that widens in the downward direction;

a bottom shell portion of a roughly spherical shape, from which a bottom is molded; and a radially widened connecting portion connecting a lower part of said cylindrical barrel portion with said bottom shell portion, said connecting portion having an arced shape and a larger diameter than the barrel portion.

18. The synthetic resin preform according to claim 17, wherein the preform comprises an inner overhang wall portion located in any position on an interior of the preform starting from an opposite side of the neck ring, which is disposed circumferentially around a lower part of the mouth portion, and ending at an upper portion of the bulging shoulder portion, with said inner wall portion having a diameter that widens in the downward direction.

19. The synthetic resin preform according to claims 17 or 18, wherein a reinforcing rib is projected from under a downside of a pinch-off portion in the bottom shell portion.

* * * * *